United States Patent Office 3,413,472
Patented Nov. 26, 1968

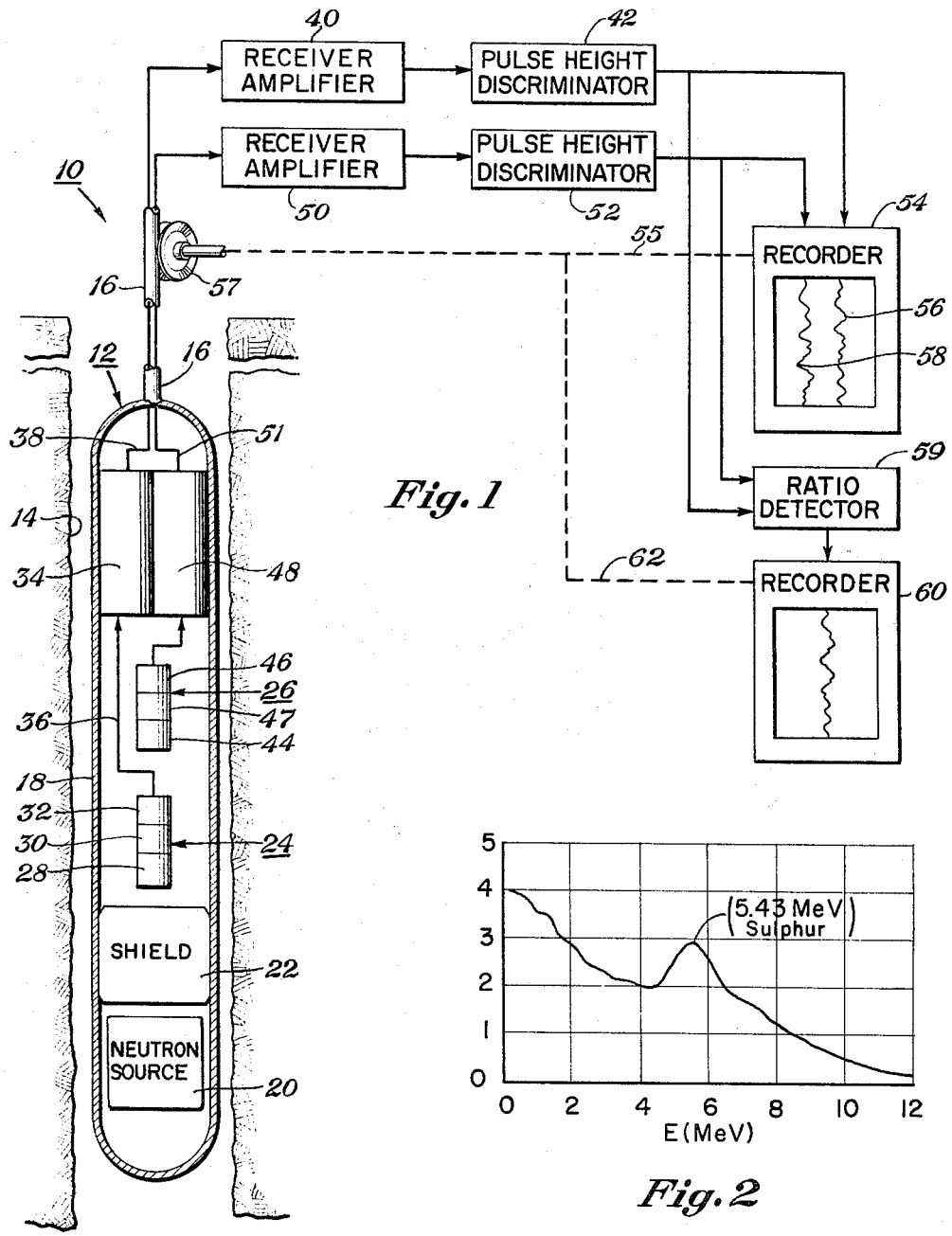

3,413,472
LOGGING SYSTEM AND METHOD FOR IDENTIFYING ANHYDRITES
Richard L. Caldwell, Dallas, Tex., assignor to Mobil Oil Corporation, a corporation of New York
Filed Aug. 28, 1964, Ser. No. 392,845
8 Claims. (Cl. 250—83.3)

ABSTRACT OF THE DISCLOSURE

Sulfurous formations are distinguished from porous formations containing hydrogenous fluid by irradiating the formation with fast neutrons and measuring the returning count rate of the neutrons and 5.43 mev. gamma rays. Measurements indicating the presence of sulfur and hydrogen in the formation indicate an anhydrite formation.

---

This invention relates to well logging, and more particularly, but not by way of limitation, relates to a method and system for logging a well bore in such a manner as to distinguish an anhydrite formation from a porous formation containing liquid water or hydrocarbons.

A number of methods are known and have been commercially used in the well logging art for studying the radioactive properties of earth formations, both where the radioactivity is natural and where it is artificially induced by bombarding the formations with nuclear energy. These logs aid immeasurably in determining the nature of the subsurface formations, and are particularly useful in the exploration for mineral or petroleum deposits of such quantities as to make them commercially inviting.

In particular, one such process heretofore used entails bombarding the adjacent formations with fast neutrons and detecting the number of thermal or epithermal neutrons scattered back to the well bore by the formation. In general, the number of thermal and epithermal neutrons returning to the well bore is dependent on the quantity of hydrogen in the formation adjacent the well bore. A decrease in the number of these neutrons returning to the well bore tends to indicate the presence of hydrogen, which in turn indicates the presence of either water or hydrocarbon. Usually these liquids are retained in the pore spaces of the formation, which is often limestone, and such a log is usually referred to as a porosity log. However, a calcium sulphate anhydrite having the chemical formula $CaSO_4 \cdot 2H_2O$ will produce substantially the same indication on the hydrogen or porosity log and therefore cannot be distinguished from porous limestone containing liquid water or oil.

The present invention contemplates a method and system for detecting the presence of anhydrite, and more specifically for distinguishing the anhydrite from a porous formation such as limestone containing water or hydrocarbon. In accordance with the broader aspects of the invention, the well bore is logged for both hydrogen and sulfur and a comparison made between the logs. If the logs reflect the presence of both hydrogen and sulfur in significant quantities, the zone is in all probability an anhydrite. However, if the logs indicate the presence of hydrogen and the absence of sulfur, then it can be expected that either liquid water or a hydrocarbon is present in a porous formation.

In accordance with a more specific aspect of the invention, the formation is irradiated by fast neutrons. The epithermal neutrons scattered back to the well bore are counted to indicate the presence of hydrogen, the gamma rays having a characteristic energy level of about 5.43 mev. (million electron volts) emitted as a result of the capture of thermal neutrons by sulfur in the formation are counted, and the ratio between the two measurements determined so as to indicate the presence or absence of an anhydrite.

Therefore, a principal object of the present invention is to provide a method and system for logging earth formations in such a manner as to distinguish between calcium sulphate anhydrite, or other sulfur containing anhydrite, from a porous formation containing liquid water or hydrocarbon.

Additional objects and advantages of the present invention will be evident to those skilled in the art from the following detailed description and drawings, wherein:

FIGURE 1 is a schematic drawing of a system constructed in accordance with the present invention; and FIGURE 2 is a plot of a typical gamma ray spectrum from a formation containing sulfur.

Referring now to the drawings, a system constructed in accordance with the present invention is indicated generally by the reference numeral 10. The system 10 is comprised of a logging tool 12 which may be lowered through a well bore 14 by means of a logging cable 16. The logging tool 12 has a fluid-tight casing 18 fabricated of a suitable material for passing neutrons such as aluminum. A fast neutron source 20 is disposed in the casing 18. The neutron source 20 may be of any suitable type such as, for example, a conventional polonium-beryllium capsule source, a conventional radium-beryllium capsule source, a conventional plutonium-beryllium capsule source, or a deuterium-tritium source of the type described in U.S. Patent No. 2,905,826. The latter source is preferred in that neutrons of greater energy are provided without producing gamma rays. A radiation shield 22, such as lead or depleted uranium, is located above the source 20 for shielding a gamma ray detector 24 and a neutron detector 26 from the source 20.

The gamma ray detector 24 may be of any suitable conventional construction, and will generally comprise a scintillation crystal 28 which may be optionally coupled to a photomultiplier tube 32 by a light pipe 30. The scintillation crystal may be thallium-activated sodium iodide, thallium-activated cesium iodide or other suitable crystal. Each time a gamma ray strikes the scintillation crystal 28, a flash of light is emitted having an intensity proportional to the energy of the gamma ray which is transmitted to the photomultiplier tube 32. The photomultiplier tube 32 converts the flash of light to an electrical pulse of proportional height which is applied to a transmitter amplifier 34 by conductor 36. The transmitter amplifier 34 may conveniently comprise a linear amplifier with a cathode or emitter-follower stage for transmitting the pulses from the photomultiplier tube 32 through the conductor 38 to a receiver amplifier 40 located at the surface. The conductor 38, or a pair of conductors if required, are disposed in the logging cable 16.

The output from the receiver amplifier 40 is applied to a pulse height analyzer and discriminator 42 which has a window set around pulse heights produced by gamma rays having an energy of about 5.43 mev., which is a characteristic energy of gamma rays given off by a sulfur atom upon capture of a thermal neutron as will hereafter be described in greater detail.

The neutron detector 26 may be of any suitable conventional construction for detecting neutrons. For example, the neutron detector may comprise a scintillation crystal 44 of lithium iodide, zinc sulphide, anthracene, or other solid crystal, which may be optically coupled to a photomultiplier tube 46 by a light pipe 47 and operates in the general manner of the gamma ray detector 24. Or the neutron detector may be a gas-filled type detector using boron trifluoride or helium-3, in which case the photomultiplier tube would not be used because the detector 26 directly produces an electrical pulse. In accordance with the preferred embodiment of the invention, only epithermal neutrons are detected and counted. This is accomplished by shielding the detector with cadmium metal for blocking the thermal neutrons and passing the epithermal neutrons. The output from the detector 26 is applied to a transmitter amplifier 48 which may also comprise a linear amplifier having a cathode-follower or emitter-follower stage. The output from the transmitter amplifier 48 is carried to a surface receiver amplifier 50 by means of the conductor 51 which is also contained within the cable 16. The output from the receiver amplifier 50 is applied to a discriminator 52 which passes only pulses corresponding to epithermal neutrons.

The outputs from the discriminators 42 and 52 are applied to separate channels of a dual trace recorder 54. The recorder 54 is synchronized with movement of the tool 12 through the borehole by a suitable synchronizing means represented by the dotted line 55 and the sheave 57 which engages the cable 16 so as to produce a log wherein the count rates are recorded with respect to depth. The sulfur log of the well bore is represented by the trace 56, while the hydrogen or porosity log is represented by the trace 58.

The outputs from the discriminators 42 and 52 may also be applied to a ratio detector 59 which produces a signal representative of the ratio between the sulfur count and the hydrogen count. The ratio ouput may conveniently be logged with respect to depth in the well bore by means of a recorder 60 which is also synchronized with movement of the tool by some conventional means represented by the dotted line 62. In general, the greater the volume of hydrogen present in the formation adjacent the tool 12, the lower the measured neutron count will be. Therefore the output from the discriminator 52 will be a minimum when the hydrogen content is at a maximum. On the other hand, the number of gamma rays having a characteristic energy of 5.43 mev. from sulfur will increase with an increase in sulfur in the formation, and the output from the disciminator 42 will be at a maximum when sulfur is present. It is therefore convenient for the ratio detector 59 to divide the output from the discriminator 42 representative of sulfur by the output representative of hydrogen so that when an anhydrite is opposite the logging tool and both the sulfur and hydrogen contents are high, the output from the ratio detector 59 will be at a maximum. If desired, the entire gamma ray spectrum may be observed in a conventional manner by means of a multichannel pulse height analyzer in conjunction with either an oscilloscope or a point plot readout. In such an event, a gamma ray spectrum such as that illustrated in FIGURE 2 might be observed, and the characteristic peak at about 5.43 mev. would indicate the presence of sulfur.

In operation of the system 10, the tool 12 is customarily lowered to the bottom of the well bore and then raised at a uniform rate to record the log. As the tool 12 is raised, the fast neutrons from the source 20 bombard the formation adjacent the tool. As the neutrons are captured by sulfur, the sulfur emits gamma rays having a characteristic energy level of about 5.43 mev. The gamma rays are sensed by the detector 24 and transmitted to the surface as electrical pulses. The pulse height analyzer 42 has a window set to pass only the pulses representative of the 5.43 mev. energy level, and the pulses passed are converted to a signal representative of the total count and the signal recorded by the recorder 54 as the trace 56.

The fast neutrons are thermalized by the formation and the thermalized neutrons tend to be captured by hydrogen atoms at a much higher rate than by other elements. Therefore a decrease in the thermal or epithermal neutrons sensed by the neutron detector 26 indicates an increase in hydrogen atoms. The electrical pulses representative of the neutrons striking the detector 26 are transmitted to the surface and applied to the discriminator 52 which passes only pulses representative of neutrons. The pulses are then converted to a signal representative of the total count which is recorded as the trace 58 by the recorder 54. If the epithermal neutron count decreases, it usually indicates an increase in hydrogen and porosity. If the sulfur count also increases, the two factors infer the presence of anhydrite. If the sulfur count does not increase, the increase in hydrogen content infers the presence of a porous formation containing water or hydrocarbon.

The outputs of the discriminators 42 and 52 are also applied to the ratio detector 59 wherein the sulfur output from the discriminator 42 is divided by the hydrogen output from the discriminator 52 and the results plotted by the recorder 60. If the value of the ratio is high, it indicates the presence of both sulfur and hydrogen and therefore is indicative of an anhydrite. If the ratio value is low, it indicates the absence of an anhydrite.

Although a particular system has been described for carrying out the present invention, it will be appreciated that in accordance with the broader aspects of the invention, the hydrogen and sulfur logs may be made by separate logging tools and corresponding depths compared to arrive at the ultimate conclusions. The comparison may be made either by inspection or by suitable electronic or computer equipment. However, the system 10 is preferred because the logging tool requires but a single neutron source and need be passed through the well bore only one time. No storage is required for the separate sulfur and hydrogen logs prior to making a direct comparison by electronic means in order to produce a direct indication of the presence of an anhydrite. The hydrogen or porosity log can be produced by measuring the count rate of either thermal or epithermal neutrons, but the measurement of epithermal neutrons is preferred.

Although preferred embodiments of the invention have been described in detail, it is to be understood that various changes, substitutions and alterations can be made therein without departing from the spirit and scope of the invention as defined by the appended claims.

What is claimed is:

1. A method for differentiating between an anhydrous subsurface formation and a porous formation containing hydrogenous fluid comprising the steps of:
   irradiating the formation with neutrons,
   measuring the neutron count returning from the formation to detect the presence of hydrogen, and
   measuring the gamma ray count returning from the formation having a characteristic energy level of about 5.43 mev. to detect the presence of sulfur,
   whereby the presence of both hydrogen and sulfur will be indicative of an anhydrous formation.

2. A method for logging a well bore to differentiate between an anhydrous formation and a porous formation containing hydrogenous fluid comprising the steps of:
   traversing the well bore with a source of fast neutrons,
   measuring the neutron count returning to the well bore,
   measuring the gamma ray count having an energy level of about 5.43 mev. returning to the well bore, and
   recording the count rates with respect to depth of the source in the well bore.

3. A method as defined in claim 2 wherein the epithermal neutron count is measured.

4. A method as defined in claim 2 wherein the thermal neutron count is measured.

5. A method as defined in claim 2 further characterized by the step of:
   determining the ratio between the gamma ray count rate and the thermal neutron count rate.

6. A system for logging a well bore to differentiate between an anhydrous formation and a porous formation containing a hydrogenous fluid comprising:
   a source of fast neutrons,
   first detector means for detecting neutrons,
   second detector means for detecting gamma rays, means for traversing the well bore with the source and the two detector means, third means coupled to the first detector means for producing a signal representative of the count rate of the neutrons, fourth means coupled to the second detector means for producing a signal representative of the count rate of the gamma rays having an energy of about 5.43 mev., and means coupled to the third and fourth means for recording the two signals with respect to the position of the source and two detector means in the well bore.

7. A system for logging a well bore as defined in claim 6 further characterized by:

means coupled to the third and fourth means for producing a signal proportional to the ratio between the signal representative of the gamma ray count and the signal representative of the neutron count.

8. A system for logging a well bore as defined in claim 6 wherein the detector means for detecting neutrons is primarily sensitive to epithermal neutrons and of much lower sensitivity to thermal neutrons.

References Cited

UNITED STATES PATENTS

| | | |
|---|---|---|
| 2,963,586 | 12/1960 | Rickard. |
| 3,108,188 | 10/1963 | Dewan et al. _____ 250—83.3 |
| 3,219,821 | 11/1965 | McKay et al. _____ 250—83.3 |
| 3,240,938 | 3/1966 | Hall _____ 250—83.3 |

RALPH G. NILSON, *Primary Examiner.*

S. ELBAUM, *Assistant Examiner.*